(12) United States Patent
Alshikh (10) Patent No.: US 11,392,791 B2
(45) Date of Patent: Jul. 19, 2022

(54) GENERATING TRAINING DATA FOR NATURAL LANGUAGE PROCESSING

(71) Applicant: Writer, Inc., San Francisco, CA (US)

(72) Inventor: Waseem Alshikh, San Francisco, CA (US)

(73) Assignee: Writer, Inc., San Francisco, CA (US)

( * ) Notice: Subject to any disclaimer, the term of this patent is extended or adjusted under 35 U.S.C. 154(b) by 471 days.

(21) Appl. No.: 16/556,225

(22) Filed: Aug. 29, 2019

(65) Prior Publication Data

US 2020/0074229 A1 Mar. 5, 2020

Related U.S. Application Data

(60) Provisional application No. 62/726,193, filed on Aug. 31, 2018.

(51) Int. Cl.
| | |
|---|---|
| *G06K 9/00* | (2022.01) |
| *G06K 9/62* | (2022.01) |
| *G06F 16/783* | (2019.01) |
| *G06N 20/00* | (2019.01) |
| *G06F 40/30* | (2020.01) |
| *G06V 40/16* | (2022.01) |

(52) U.S. Cl.
CPC ......... *G06K 9/6256* (2013.01); *G06F 16/784* (2019.01); *G06F 40/30* (2020.01); *G06N 20/00* (2019.01); *G06V 40/176* (2022.01); *G06V 40/179* (2022.01); *G06V 2201/10* (2022.01)

(58) Field of Classification Search
CPC .. G06F 16/783; G06F 16/784; G06F 16/7844; G06F 40/30; G06K 9/6256; G06N 20/00; G06V 20/46; G06V 20/635; G06V 2201/10; G06V 30/10; G06V 40/161; G06V 40/176; G06V 40/179
See application file for complete search history.

(56) References Cited

U.S. PATENT DOCUMENTS

| | | | | |
|---|---|---|---|---|
| 10,671,854 | B1* | 6/2020 | Mahyar | G06N 3/0427 |
| 11,120,293 | B1* | 9/2021 | Rosenzweig | H04N 19/142 |
| 11,153,655 | B1* | 10/2021 | Germano | H04N 21/4756 |
| 2019/0026367 | A1* | 1/2019 | Boss | G06V 20/40 |
| 2019/0108419 | A1* | 4/2019 | Coven | G06K 9/6289 |
| 2019/0237061 | A1* | 8/2019 | Rusak | G06F 40/35 |
| 2019/0294668 | A1* | 9/2019 | Goel | H04N 21/234336 |
| 2019/0295545 | A1* | 9/2019 | Andreas | G10L 15/1815 |
| 2020/0005047 | A1* | 1/2020 | Polatkan | G06V 20/47 |
| 2020/0057807 | A1* | 2/2020 | Kapur | G06N 3/0445 |
| 2021/0050000 | A1* | 2/2021 | Danilo | G06V 40/174 |
| 2021/0117685 | A1* | 4/2021 | Sureshkumar | G06F 40/30 |
| 2021/0264097 | A1* | 8/2021 | Herzig | G06F 40/289 |
| 2021/0264909 | A1* | 8/2021 | Reece | G06V 40/18 |

\* cited by examiner

*Primary Examiner* — Avinash Yentrapati
(74) *Attorney, Agent, or Firm* — Fenwick & West LLP (57) ABSTRACT

A training data system enables the generation of training data based on video content received from one or more outside video sources. For example, the generated training data can include a transcript of a word or phrase alongside emotion, language style, and brand perception data associated with that word or phrase. To generate the training data from a video, the subtitles, video frame, metadata, and audio levels of the video can be analyzed by the training data system. The generated training data (potentially from a plurality of videos) can then be grouped into a set of training data and used to train machine learning modules for Natural Language Processing (NLP) techniques.

18 Claims, 6 Drawing Sheets

GENERATING TRAINING DATA FOR NATURAL LANGUAGE PROCESSING

CROSS REFERENCE TO RELATED APPLICATIONS

This application claims the benefit of U.S. Provisional Application No. 62/726,193, filed Aug. 31, 2018, which is incorporated by reference in its entirety.

FIELD OF THE INVENTION

This disclosure relates generally to training natural language processing models and more specifically to a method and system for generating training data for a natural language processing model based on visual data.

BACKGROUND OF THE INVENTION

Natural Language Processing (NLP) techniques, including for example speech recognition, understanding, generation, and translation, have wide application in facilitating the interaction between humans and computerized systems. To implement various NLP techniques, many NLP systems rely on machine learning models trained for a specific NLP application. However, training a machine learning model can require a large volume of training data tailored for that specific application. Further, models for implementing NLP techniques are often trained using supervised machine learning techniques (utilizing labeled training data). Training data for NLP techniques can include a set of words, phrases, or sentences, each associated with one or more labels or characteristics of the word/phrase/sentence.

One barrier to effectively implementing machine learning techniques is access to enough suitable training data. Traditional methods of generating labeled training data can rely on manual labeling of specific training content, therefore the generation of training data suitable for NLP techniques can be costly and time consuming. For example, training data for NLP techniques is required at minimum to be in the correct language (and can be even more specifically tailored to certain situations or dialects). Finding adequate sets of training can be challenging, especially for less common languages or dialects. Similarly, even if a minimum required amount of training data is available, additional or higher quality training data can be useful to improve the quality of trained machine learning models. Some applications of NLP techniques, such as content systems, can rely on the ability to handle a wide variety of languages, even less widely spoken languages. Lacking suitable training data can negatively impact the applicability of NLP systems by reducing the pool of languages the NLP system can interact with. Therefore, cost effective and automated methods of generating training data for NLP techniques are needed.

SUMMARY

This disclosure describes techniques for generating training data for NLP systems from video content. A training data system enables the generation of training data based on video content received from one or more outside video sources. For example, the generated training data can include a transcript of a word or phrase alongside emotion, language style, and brand perception data associated with that word or phrase. To generate the training data from a given video file, the subtitles, video frame, metadata, and audio levels of the video can be analyzed by the training data system. The generated training data (potentially extracted from a plurality of video files) can then be grouped into a set of training data which can be used to train machine learning modules for NLP techniques.

In some embodiments, emotion data for a given video is generated through analysis of the video frames of a video file. For example, facial recognition and emotion recognition techniques can be applied to the video frames of a video to determine emotion data. Similarly, language style data can be determined based on metadata tags and analysis of other aspects of the video file.

BRIEF DESCRIPTION OF THE DRAWINGS

The following detailed description refers to the accompanying drawings, wherein.

DETAILED DESCRIPTION

Throughout the description, for the purposes of explanation, numerous specific details are set forth to provide a thorough understanding of the present invention. It will be apparent to one skilled in the art, however, that the present invention may be practiced with variations to these details. In some instances, structures and devices are shown in block diagram form to avoid obscuring the underlying principles of the invention.

Disclosure Overview

A training data system can generate training data for training machine learning models for implementing Natural Language Processing (NLP) techniques (Herein, "NLP training data"). As described above, NLP training data is often inadequate or hard to acquire, especially for languages less commonly used for NLP. However, online video content is widely and freely (or inexpensively) available from a variety of sources. Online video content often includes subtitles and other metadata, enabling a training data system to extract NLP training data from a selected set of videos in a target language. Therefore, using the available subtitles and metadata, the training data system can generate NLP training data based on video content received from one or more outside video sources. Using a training data system as described herein can, through the generation of appropriate NLP training data, enable the use of machine learning based NLP techniques for uncommonly spoken languages, dialects, or in other situations where suitable NLP training data is unavailable.

System Overview

Figure 1:
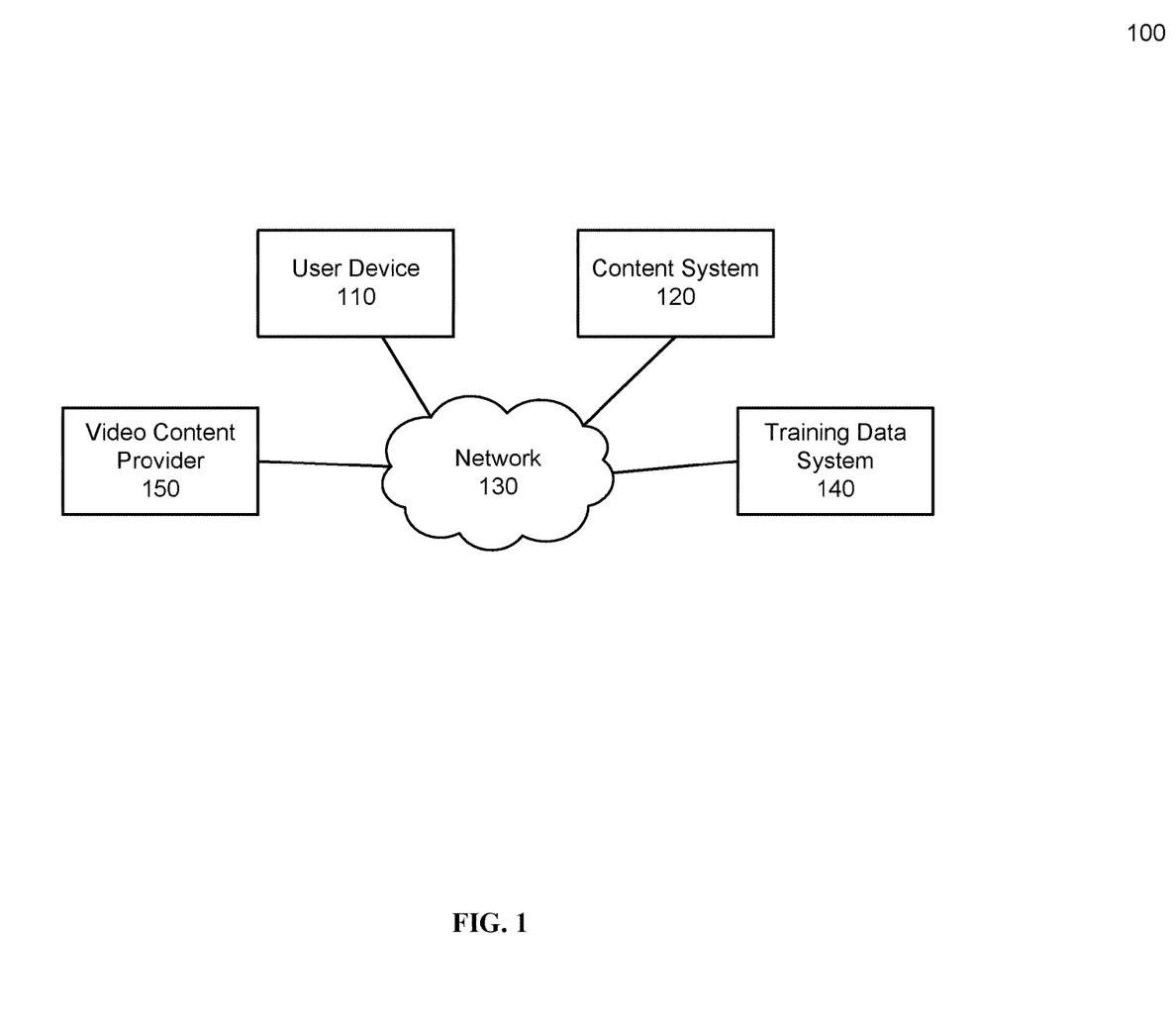
FIG. 1 is a block diagram illustrating an example environment in which a training data system operates, according to one embodiment.

FIG. 1 is a block diagram illustrating an example environment in which a training data system operates, according to one embodiment. The environment 100 of FIG. 1 includes a user device 110, content system 120, network 130, training data system 140, and video content provider 150. For clarity only one user device 110, content system 120, and video content provider 150 have been shown. However, embodiments can include many user devices 110, content systems 120, and video content providers 150.

In some embodiments, a user device 110 is a computing device capable of interacting with a content system 120 to retrieve and display translated content to an associated user. For example, a user device 110 can be a mobile computing device, laptop or desktop computer, tablet, or other suitable device capable of interfacing electronically with a content system 120 and displaying content to the associated user. In some implementations, each user device 110 is operated by a user and can display translated content to the user as provided by the content system 120. In some implementations, each user device 110 is associated with a language setting for displaying content, for example a language spoken by the user of the user device 110. Therefore, in some embodiments, the content system 120 is capable of translating application content for display on a user device 110. Interactions between user devices 110 and the content system 120 can occur over a network 130 or other suitable communication channel. For example, a user device 110 may indirectly interact with a content system 120 when content translated by the content system 120 is presented on the user device 110 (for example, via an app translated by the content system 120 or via a client server associated with the content system 120).

Additionally, user devices 110 can provide settings or other indications of the preferences or demographics of the associated users to the content system 120. For example, a user device 110 can transmit an age, location, or other demographic information about an associated user to the content system 120. Similarly, a user device 110 can collect information about interactions between a user operating the user device 110 and content translated by the content system 120, for example, to improve the translations of the content system 120.

The content system 120 translates content for display to one or more users via user devices 110, according to some embodiments. In some implementations, content associated with an outside client server is translated by the content system 120. Content to be translated can be separated into one or more content segments to be translated by the content system 120 and returned to the client server. Content segments can include, for example, text passages, menu items, articles, banners, and multimedia items such as video or audio recordings and can be predefined or automatically generated by the content system 120. Translated content segments can be provided to a client server or, in some implementations, provided directly to a user device 110 for display. In some embodiments, the content system 120 is separate from the client server and communication between the content system 120 and the client server occurs over a network 120. However, in other embodiments, the content system 120 is directly connected to or integrated within the client server.

To translate content or content segments, the content system 120 can use NLP techniques. For example, NLP techniques can be used to determine the meaning, tone, and/or intent of content to be translated. Similarly, NLP techniques can be used to better match the tone of translated content to the tone of the original content. In some embodiments, the content system 120 uses an affect detection model to determine emotions present in content or content segments. An affect detection model can be specific to the language of the content or content segments, that is, the affect detection model is trained for each language of content the affect detection model will be applied to. The content system 120 can use any suitable machine learning technique to generate an affect detection model. For example, the content system 120 can use supervised learning techniques to train the affect detection model based on NLP training data for each language supported by the content system 120. In some embodiments, training sets for affect detection model training are provided by the training data system 140. Similarly, the training data system 140 can provide training data used to train models for any other suitable NLP technique. In some embodiments, the training data system 140 is integrated into or otherwise associated with the content system 120.

In some implementations, the network 130 is a local area or wireless area network, or any suitable combination of local area or wide area networks, and can be composed of wired, wireless, or any combination of wired or wireless networks. The network 130 can communicatively connect the user device 110, content system 120, training data system 140, and video content provider 150. In some implementations, a network 130 uses standard communication protocols such as hypertext transport protocol (HTTP) or transmission control protocol/Internet protocol (TCP/IP). Similarly, the network 130 can use technologies such as Ethernet, 4G LTE, or a digital subscriber line (DSL). In some embodiments, encrypted data can be transmitted over the network 130.

The training data system 140 is a computing system capable of generating and transmitting sets of training data for training machine learning models for use in NLP systems or techniques (herein, "NLP models"), according to some embodiments. The training data system 140 can comprise, for example, a server, group of servers, personal computer, or other suitable computing system. In some implementations, the training data system 140 analyzes video content associated with a target language to generate sets of training data for training NLP models (herein, "NLP training sets"). For example, the training data system 140 can receive video content, in some implementations with associated metadata, from a video content provider 150 or another suitable video content source. Then, the training data system 140 can analyze or otherwise process the video content to generate NLP training data for one or more languages associated with the video content. In some embodiments, the generated NLP training data is then organized into one or more NLP training sets and transmitted to the content system 120. The training data system 140 will be discussed in greater detail in relation to FIG. 2 below.

The video content provider 150, according to some embodiments, is a computing system capable of transmitting video content and associated metadata to the training data system 140. The video content provider 150 can directly transmit, make available for download, stream or otherwise provide video content to the training data system 140. Video content can be transmitted as individual videos, or in batches of multiple videos. Video content provided by the video content provider 150 can be associated with subtitles or other metadata. In some implementations, the video content provided by the video content provider is publically available for streaming or download.

Training Data System

Provided below is an example system for generating machine learning training data for NLP models from video content. Although certain of the elements may be depicted as separate components, in some instances one or more of the components may be combined into a single device or system. Likewise, although certain functionality may be described as being performed by a single element or component within the system, the functionality may, in some instances, be performed by multiple components or elements working together in a functionally coordinated manner. In addition, communications between the various elements described herein may comprise the exchange of data or information using electronic messages on any suitable electronic communication medium as would be well known and appreciated by persons of skill in the art.

The training data system 140, as described above, can generate and transmit training data for training NLP models. For example, the training data system 140 can analyze video content in a target language to generate a NLP training set for the target language. Then, responsive to a request by the content system 120 (or other similar system) for training data associated with the target language, the training data system 140 can transmit the generated NLP training set to the content system 120. The training data system 140 can receive video content, then analyze or otherwise process the video data to generate NLP training data for one or more languages.

Figure 2:
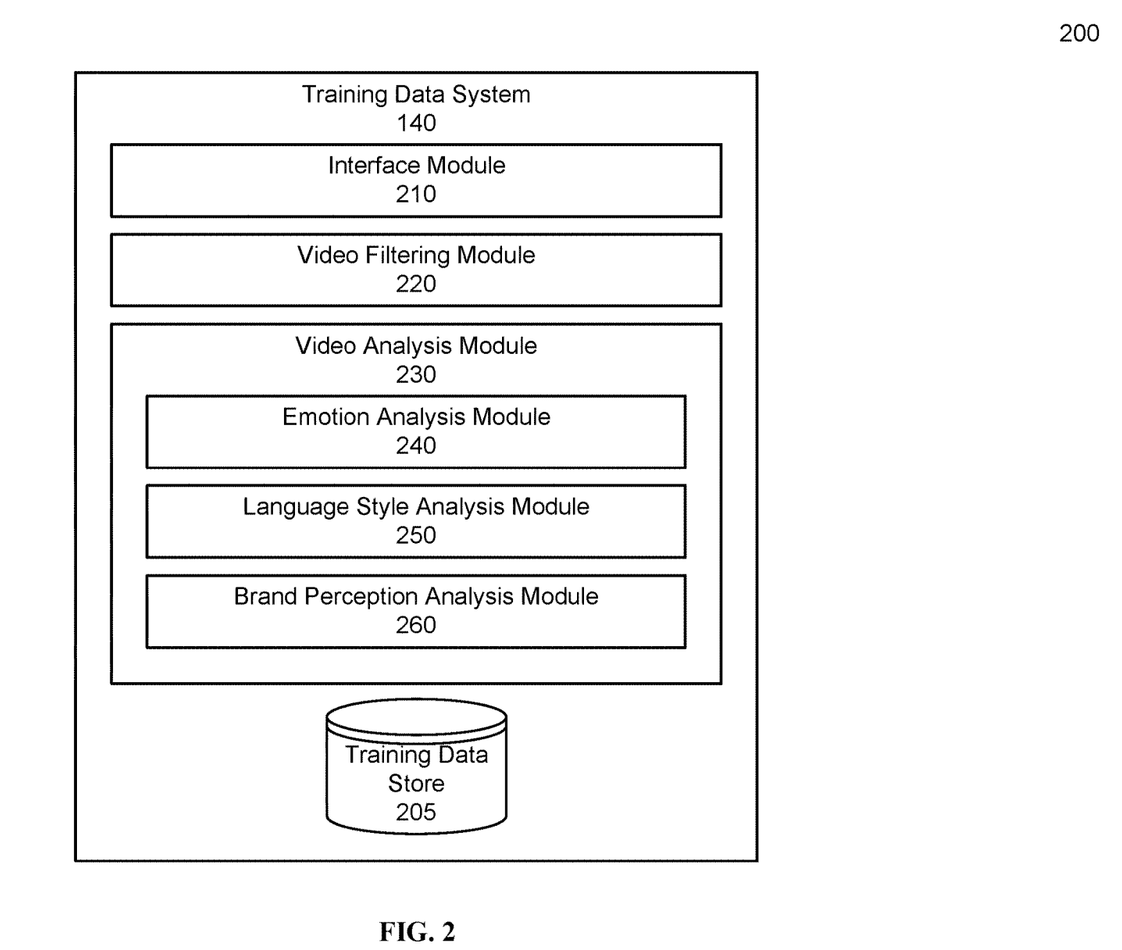
FIG. 2 is a block diagram of an example training data system, according to one embodiment.

FIG. 2 is a block diagram of an example training data system 140, according to one embodiment. The training data system 140 of FIG. 2 comprises a training data store 205, an interface module 210, a video filtering module 220, and a video analysis module 230. As discussed above, the training data system 140 can generate training data for NLP models based on video content in an associated language.

The training data store 205, according to some embodiments, stores NLP training data generated by the training data system 140. As described above, NLP training data can be generated based on video content to generate one or more NLP training sets associated with a target language. The training data system 140 can then separately store the NLP training sets in the training data store 205 without needing to store the original video content from which the NLP training data was guaranteed. Each NLP training set can comprise a set of NLP training points which are used to train a NLP model with respect to a variety of words or phrases in the target language. In some implementations, each stored training data point comprises a word or phrase in the target language and ranking or label of the word or phrase in one or more data categories giving insight into the emotional response or perception of a user hearing the word/phrase as used in the video content. For example, a training data point can comprise a word in the target language, emotion data describing a primary emotion or emotions associated with the word as used in the video content, language style data describing the tone or formality of the word as used in the video content, and brand perception data describing a user's perception of the provider of the content after hearing the word as used in the video content. NLP training data can be stored within the training data store 205 in any suitable format, such as in a file or feature vector in any suitable database or file-based storage method. For example, FIG. 3 depicts an example format for storing NLP training data within the training data store 205.

Figure 3:
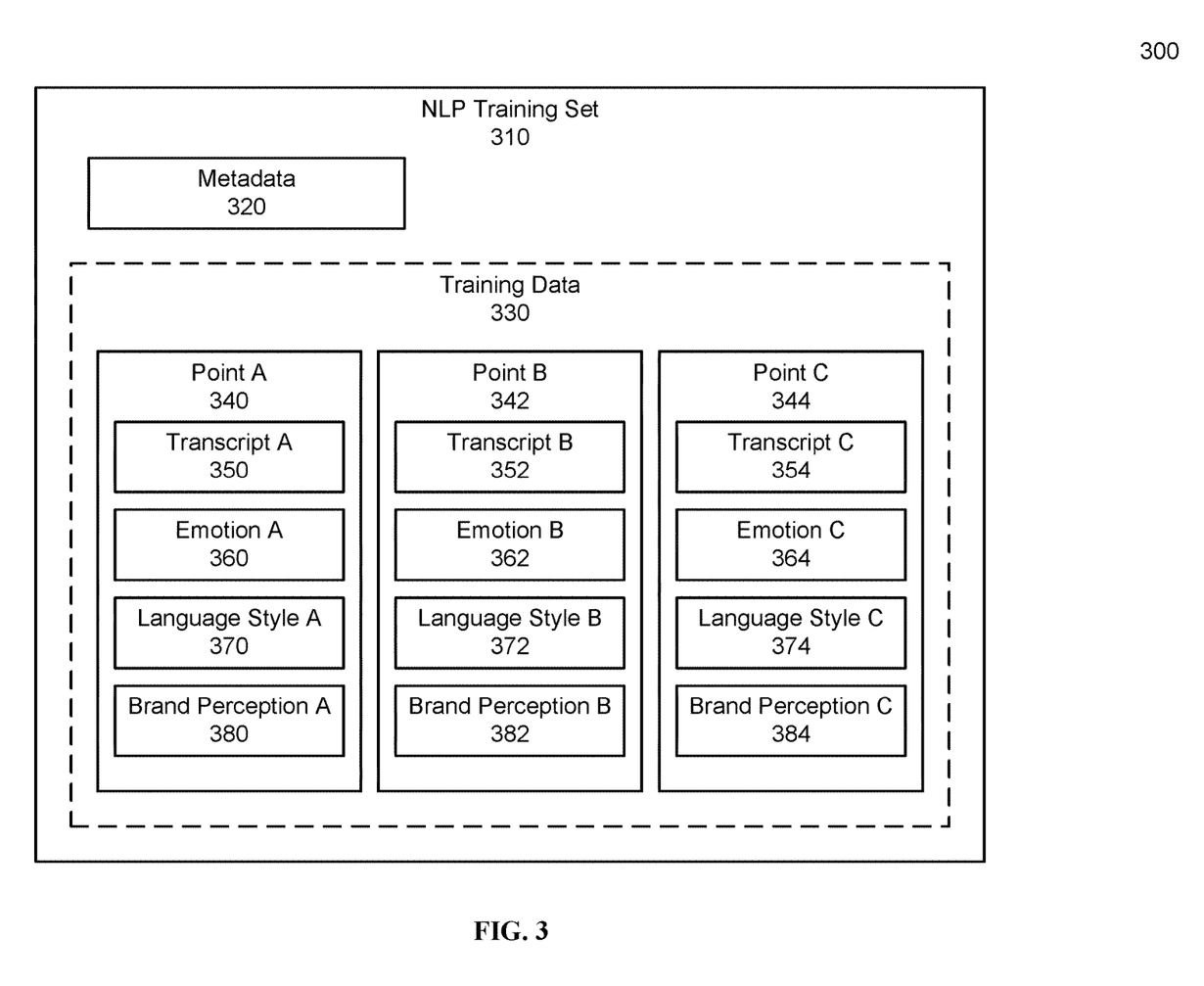
FIG. 3 is a block diagram of an example format for storing training data for natural language processing algorithms, according to one embodiment.

FIG. 3 is a block diagram of an example format for storing training data for natural language processing algorithms, according to one embodiment. The environment 300 of FIG. 3 comprises a NLP training set 310 including metadata 320 and training data 330 comprising a plurality of training data points 340-344. Each training data point 340-344 includes a transcript 350-354 representing a word or phrase and data parameters associated with the transcript, in this embodiment, emotion data 360-364, language style data 370-374, and brand perception data 380-384. In some implementations, training data is stored in the training data store in the format of FIG. 3. The NLP training set 310 can be a set of NLP training data generated for use in training NLP models (or any other suitable machine learning model) for a target language. The metadata 320 describes relevant information about the NLP training set 310 and training data 330, such as the target language of the NLP training set 310, the format the associated training data points 340-344 are stored in, a date the NLP training set 310 was generated, a source of the video content used to generate the NLP training set 310, or any other relevant information about the NLP training set 310 or the training data 330. In the embodiment of FIG. 3, the training data 330 comprise three training data points, points A 340, B 342, and C 344. However, other embodiments can include any suitable number of training data points 340-344 within a NLP training set 310. Each training data point 340-344 can comprise a transcript 350-354 of a word or phrase which the remaining parameters of the training data are associated with. For example, transcript A 350 can be the word "cat," transcript B 352 can be the word "performance," and transcript C 354 can be the phrase "ladies and gentlemen." In some implementations of training for NLP models, the transcript 350-354 will form part of the input vector when training the model.

As described above, each training data point 340-344 is also associated with a set of data parameters associated with the transcript 350-354, in this embodiment, emotion data 360-364, language style data 370-374, and brand perception data 380-384. In some implementations of training for NLP models, these data parameters will form part of the target vector when training the model. Data parameters associated with a training data point 340-344 may comprise a single value, multiple values, a classification into a category, or any other suitable data about the transcript 350-354. The emotion data 360-364 is a data parameter describing the emotional connotations of the associated transcript 350-354, according to some embodiments. The emotion data 360-364 can identify a predominant emotion associated with the transcript 350-354, for example "Anger" or "Joy." In other implementations, emotion data 360-364 can comprise a plurality of values describing the strength of association between the transcript 350-354 and one of a set of basic emotions. For example, the emotion data 360 may comprise 5 values, each value representing the strength of association between the transcript 350 and one of "Joy," "Anger," "Fear," "Sadness," and "Urgency" such as on a scale from 0-100%. Similarly, language style data 370-374 can describe, for example the speaking style or tone used in the original video content when the transcript 350-354 was recited. In some embodiments, the language style data 370-374 comprises 4 values, each value representing the strength of association between the transcript 350-354 and one of "Analytical," "Confident," "Tentative," or "Informal" such as on a scale from 0-100%. Similarly, the language style data 370-374 can comprise a single value classifying the transcript 350-354 into a primary language style. According to some embodiments, brand perception data 380-384 describes the predicted perception of a brand based on the usage of the transcript 350-354 in material associated with the brand or content provider. For example, a content provider can tailor translated content to a specific demographic (or match the brand perception of the original content) based on brand perception data. In some implementations, the brand perception data 380-384 comprises 5 values representing brand perception in categories of "Openness," "Extraversion," "Agreeableness," "Emotional Sensitivity," and "Conscientiousness" such as on a scale from 0-100%. In other embodiments, the brand perception data 380-384 can comprise a single value classifying the transcript 350-354 into a primary language style. The embodiment of FIG. 3 uses emotion data, language style data, and brand perception data as data parameters, however, in other embodiments any suitable data parameters can be used.

Figure 4:
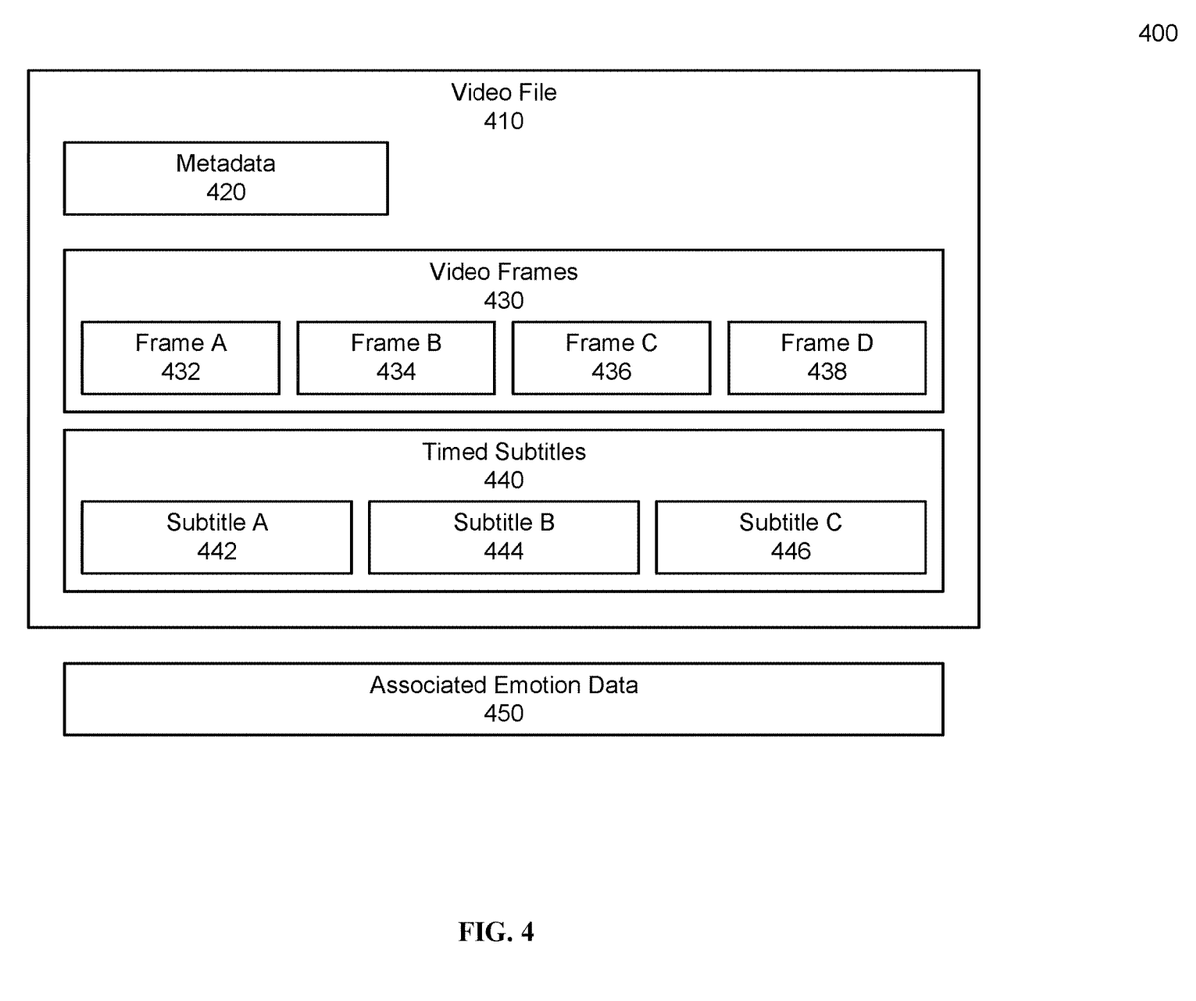
FIG. 4 is a block diagram of an example format in which video data is received, according to one embodiment.

Returning to FIG. 2, the interface module 210 can interface with one or more video content providers 150 to receive video content for analysis by the training data system 140. Similarly, the interface module 210 can interface with the content system 120 to transmit generated NLP training data, for example based on a request for training data by the content system 120. In some implementations, the interface module 210 receives any suitable information needed to generate and transmit training data. The interface module 210 can receive video content as a single video, in a batch of multiple videos, in a streaming format, or in any suitable format. For example, FIG. 4 depicts an example format in which video content can be received from the video content provider. In some implementations, received video content is temporarily or transiently stored at the training data system 140 while the video content is analyzed and corresponding NLP training data is generated. Temporarily stored video content can subsequently be deleted when the corresponding NLP training data is generated.

FIG. 4 is a block diagram of an example format in which video content can be received, according to one embodiment. The video file 410 can comprise a video stored in any suitable format or codec, for example, H.264, H.265, WMV, or any other suitable format/codec. The video file 410 of FIG. 4 includes metadata 420, a set of video frames 430 comprising the visual data of the video file 410, and a set of timed subtitles 440. In some implementations, the video file 410 is a single file containing embedded metadata 420 and subtitles 440, however in some embodiments the video file 410 includes separate files to store metadata 420 and subtitles 440. Similarly, a video file 410 can comprise a plurality of related videos stored in separate files, according to some embodiments. Further, associated emotion data 450 about the video file 410 can be separately received at the training data system 140. In some implementations, the training data system 140 requests associated emotion data 450 for each video file 410 from an outside system, however emotion data 450 for a video file 410 can also be determined by the training data system 140.

The metadata 420 of a video file 410 can comprise any relevant information about the video file 410. For example, the metadata 420 can include a language of the video, one or more "tags" or "labels" describing the content or setting of the video file 410, a length or runtime of the video file 410, or other relevant information about the video file 410. In some implementations, the metadata 420 is embedded within the video storing the video frames 430, but metadata 420 can also be stored in an external file, retrieved from a separate website or location indexing the video file 410, or determined by any suitable method or combination of methods.

In the embodiment of FIG. 4, the frames A-D 432-438 are contained within the set of video frames 430. Each frame 432-438 of the set of video frames can comprise visual data which corresponds to the metadata 410 and one or more timed subtitles 440. Each video frame 432-438 may be synced to audio and subtitle data.

The timed subtitles 440, according to some embodiments, are a series of timed captions or transcripts describing dialog in the video file. The subtitles 440 may be embedded within the video file 410, but in other embodiments can be retrieved from an external subtitle file or generated using any suitable method. The subtitles A-C 442-446 can each comprise a word, phrase, or sentence associated with a specific range of video frames 430. During normal playback of the video file 410 each of the timed subtitles 440 can be overlaid on the associated video frames 430 allowing users viewing the video file 410 to read along with spoken dialogue or narration of the video file 410. Therefore, each subtitle 442-446 can provide a transcript of dialog occurring in the video file 410 during the associated range of frames (or at the associated time).

Returning to FIG. 2, the video filtering module 220 can review available video content and filter suitable videos for generating NLP training data. In some implementations, the video filtering module 220 filters available videos at one or more video content providers 150 and requests selected videos based on the filtering. In other embodiments, video files are received at the training data system 140 and then filtered to remove unsuitable video files. The video filtering module 220 can review the metadata associated with each received video and determine an appropriate NLP training set to associate the video file with. In some embodiments, the video filtering module can filter video files based on a language spoken in the video, the length of the video, or any relevant metadata about the video. For example video files without associated subtitle data can be filtered out by the video filtering module 220. Similarly, video files can be filtered based on the content of transcript or subtitle information associated with the video file 410. In some embodiments, the video analysis module 230 uses video analysis techniques which rely on the speaker being present onscreen in the video to be analyzed. Consequently, videos tagged as an interview, lecture, speech, news broadcast, or other situation where the subject of the video is often speaking directly to the camera can be selected by the video filtering module 220 for analysis by the video analysis module 230. Similarly, video categories where dialog is mainly presented by an off-screen announcer, such as sporting events or nature documentaries, can be filtered out by the video filtering module 220. Any suitable filtering technique can be employed by the video filtering module 220 to filter incoming videos. In some implementations, the video filtering module 220 uses a set of rules to filter videos based on language, tags, and other suitable metadata information. In other embodiments, the video filtering module 220 selects videos for generation of NLP training data partly based on a machine learning model trained based on feedback from previously generated NLP training data. For example, the content system 120 may send feedback about the quality of one or more NLP training sets to the training data system 140. A machine learning model can then be trained based on the received feedback and the original video files (or video metadata) used to generate the NLP training sets associated with the received feedback. The resulting machine learning model can then be used to improve the quality of video files selected to generate future NLP training data. In some implementations, the video filtering module 220 ranks suitable videos (for example, based on the output of the machine learning module discussed above) and selects a set of videos to be used to generate a NLP training set. In some implementations, videos of above a threshold rank are selected to generate a NLP training set. Once a video is selected to be used to generate NLP training data, the video analysis module 230 can then analyze the selected videos.

In some embodiments, the video analysis module 230 generates one or more NLP training sets from video content. For example, the video analysis module 230 can separate one or more video files 410 into a plurality of training data points 340-344, which can then be grouped into a corresponding NLP training set 310. In some embodiments, the video analysis module 230 generates a set of training data points from a video file 410 by segmenting the information associated with the video file 410 into a set of training data points based on the timed subtitles 440 of the video file 410, where each training data point is associated with a word, short phrase, or other suitable segment of a subtitle 440 from the video file 410. In some implementations, each training data point is also associated with a range of video frames 430 in the video file based on the subtitle 442-446 or segment of a subtitle 442-446 the training data point is associated with. Then, in some embodiments, the video analysis module 230 can determine data parameters for each training data point based on the video frames associated with the word or phrase as used in the video file 410. Similarly, data parameters can be generated based on metadata associated with the video file 410, other data parameters of the training data point, or any suitable combination of metadata, video frame data 430, and previously generated data parameters. After a training data point is generated, the video analysis module 230 can store the completed training data point in the training data store 205 as part of a NLP training set. In some embodiments, the video analysis module 230 comprises an emotion analysis module 240 to generate emotion data parameters, a language style analysis module 250 to generate language style data parameters, and a brand perception analysis module 260 to generate brand perception data parameters.

The emotion analysis module 240 can determine emotion data for video files 410 and associate the determined emotion data with one or more training data points, according to some embodiments. In some implementations, the emotion analysis module 240 directly determines emotion data for a video file 410 or training data point, however, in other embodiments, the emotion analysis module 240 requests emotion data from an outside emotion analysis system or emotion recognition system. Emotion data determined by the emotion analysis module 240 can indicate a mood, primary emotion, or other measure of the emotional content of one or more frames or sections of a video file 410. For example, emotion data can provide a rating of a section of a video file 410 with respect to each of one or more emotions (for example, "Joy," "Anger," "Fear," "Sadness," "Urgency", and/or any other suitable emotions), can indicate only a primary emotion for each section of a video file 410, or can provide any other suitable measure of emotional content. In some implementations, each video frame 430, section, training data point, or segment of predefined length of a video file 410 can be associated with emotion data. After emotion data is determined for a video file 410, the emotion analysis module 240 associates the determined emotion data with each training data point, according to some embodiments. For example, emotion data associated with a specific video frame 430 can be associated with the training data point including that frame 430. In cases where more than one set of emotion data is associated with a single training data point, for example if the determined emotion data changes during the range of times associated with a training data point, the emotion data can be averaged or combined in any suitable manner.

To determine emotion data for a video file 410 or segment of a video file 410, the emotion analysis module 240 (or outside emotion analysis system) can analyze the video frames 430 of the video file 410. For example, the emotion analysis module 240 can utilize machine learning techniques to determine emotion data based on video frames 430. For example, the emotion analysis module 240 can use facial recognition techniques to identify faces in a video frame 430. Then, machine learning based emotion recognition techniques can analyze the identified faces for emotion. For example, emotion recognition techniques can rate a face with respect to a set of emotions (such as "Joy," "Anger," "Fear," "Sadness," and "Urgency" as described above). This process can be repeated for each frame (or a selected set of frames) to determine emotion data for the whole video file 410 or for an individual training data point.

In some embodiments, the language style analysis module 250 determines a language style for a training data point based on the metadata 420 of the video file 410 and other relevant factors of the video file 410. Language style data generated by the language style analysis module 250 can indicate a communication style or general sentiment of one or more frames or sections of a video file 410. For example, language style data can provide a rating of a section of a video file 410 with respect to each of one or more communication styles, can indicate a primary communication style of a video file 410, or can provide any other suitable measure of communication style. For example, language style data can rate a video file 410 in categories of "Analytical," "Confident," "Tentative," "Informal," or any other suitable categories or combination of categories. According to some embodiments, language style data is determined for each video file 410 as a whole, but in other cases, language style data is individually determined for each training data point.

The language style analysis module 250 can determine language style data, for example, based on a combination of factors associated with the video file 410 using multimodal sentiment analysis techniques (or other suitable techniques). In some implementations metadata tags included in the metadata 420 can be associated with specific language styles based on common language styles used in the context or associated with the concept of the metadata tag. For example, metadata tags for "work" (or related concepts) can be associated with a low score in the informality language style category, "teacher" or "lecture" with a high analytical score, "speech" with a low tentative score, and the like. Similarly, other information about the video file 410 can be used to determine language style data, for example, an audio level or "loudness" of the video file 410 or section of the video file 410 can be used to influence the "tentative" category. In some embodiments, timed subtitles 440, audio features (such as a beat histogram, beat sum, or other suitable feature of the audio of the video file 410) can be used to determine language style data either on a per-section basis or for the video file 410 as a whole.

In some implementations, the brand perception analysis module 260 determines brand perception data for each training data point based on the emotion and language style data associated with that training data point. As described above, brand perception for a training data point can be rated on a scale of 0-100% in categories of "Openness," "Extraversion," "Agreeableness," "Emotional Sensitivity," and "Conscientiousness." In some embodiments, the brand perception analysis module 260 can determine brand perception data for a training data point based on the emotion and language style data for that training data point. Brand perception data for each category can be determined based on a weighted combination of one or more categories of emotional or language style data of the training data point (along with any other suitable factor of the associated video file 410 or training data point). For example, the "Extraversion" category of brand perception data can be determined through a weighted combination of "Joy" emotion data and "Confident" language style data. Similarly, the "Openness" category of brand perception data can be determined based on the "Informal" category of language style data along with other suitable factors.

After the data parameters for the transcript of a training data point are determined, the training data point can then be used as training data for training machine learning models. For example, training data points can be grouped (for example, by target language or other criteria) into NLP training sets and used to train NLP models as described above. Because subtitled video content is available in many languages, the use of a training data system 140 can allow NLP training data to be generated for many uncommon languages, even languages for which NLP machine learning models are not commonly used. This can allow a content system 120 (or other suitable system) to employ NLP techniques for more languages than previously possible when using existing methods of acquiring training data.

Figure 5:
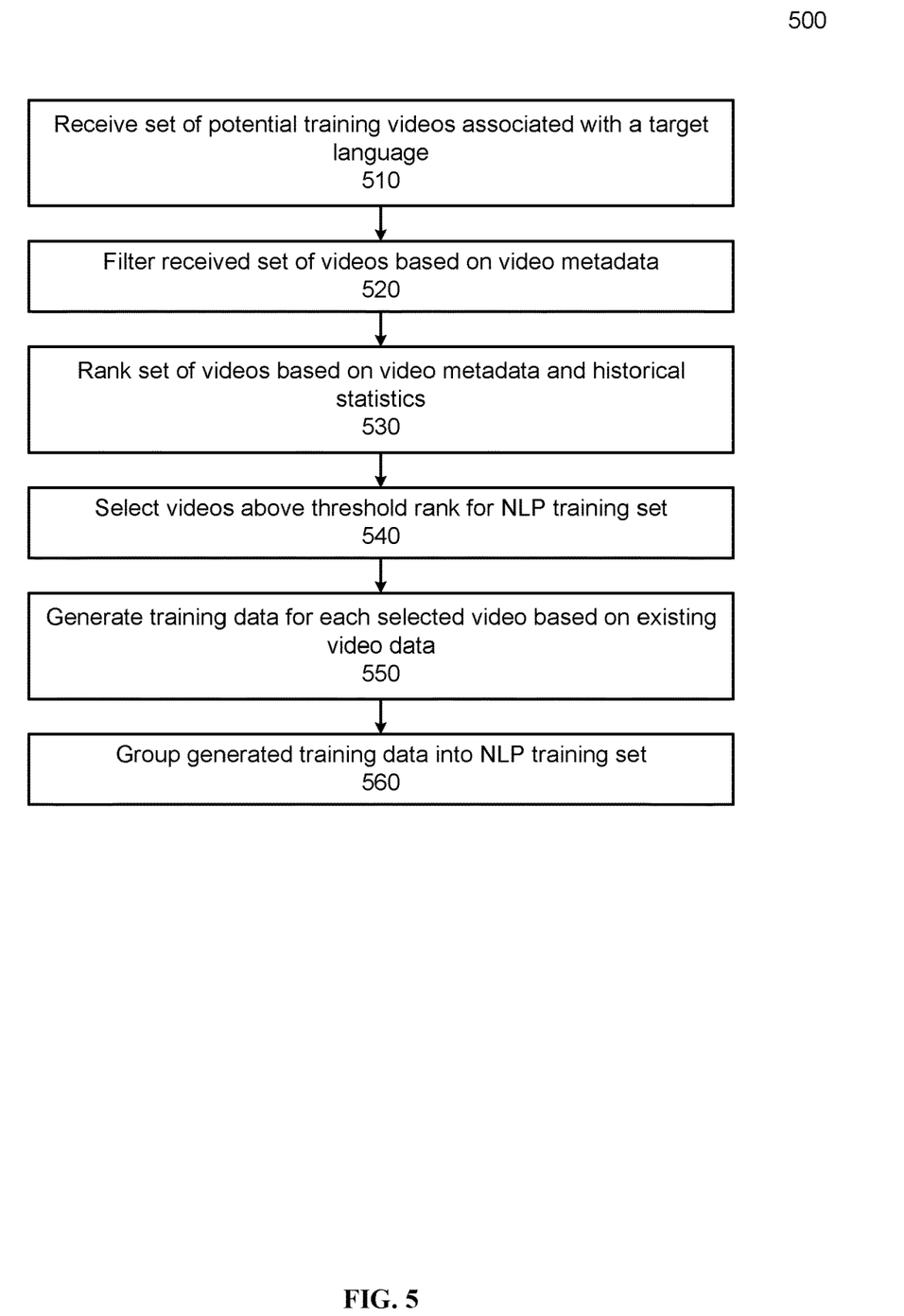
FIG. 5 is a flowchart depicting an example process for generating training data for natural language processing based on video data, according to one embodiment.

FIG. 5 is a flowchart depicting an example process for generating training data for natural language processing based on video data, according to one embodiment. The process 500 of FIG. 5 begins when the training data system receives 510 a set of potential training videos associated with a target language. For example, potential training videos can be received from a video content provider or other similar system. Then, the received set of potential training videos can be filtered 520, for example based on metadata associated with each video of the received set of videos. The remaining set of potential training videos is ranked 530, for example based on video metadata and the historical performance of similar video in generating training data, and videos above a threshold rank are selected 540 to generate NLP training data. NLP training data can then be generated 550 from each video of the selected set of videos, and the generated training data is grouped 560 into a NLP training set for later use.

Figure 6:
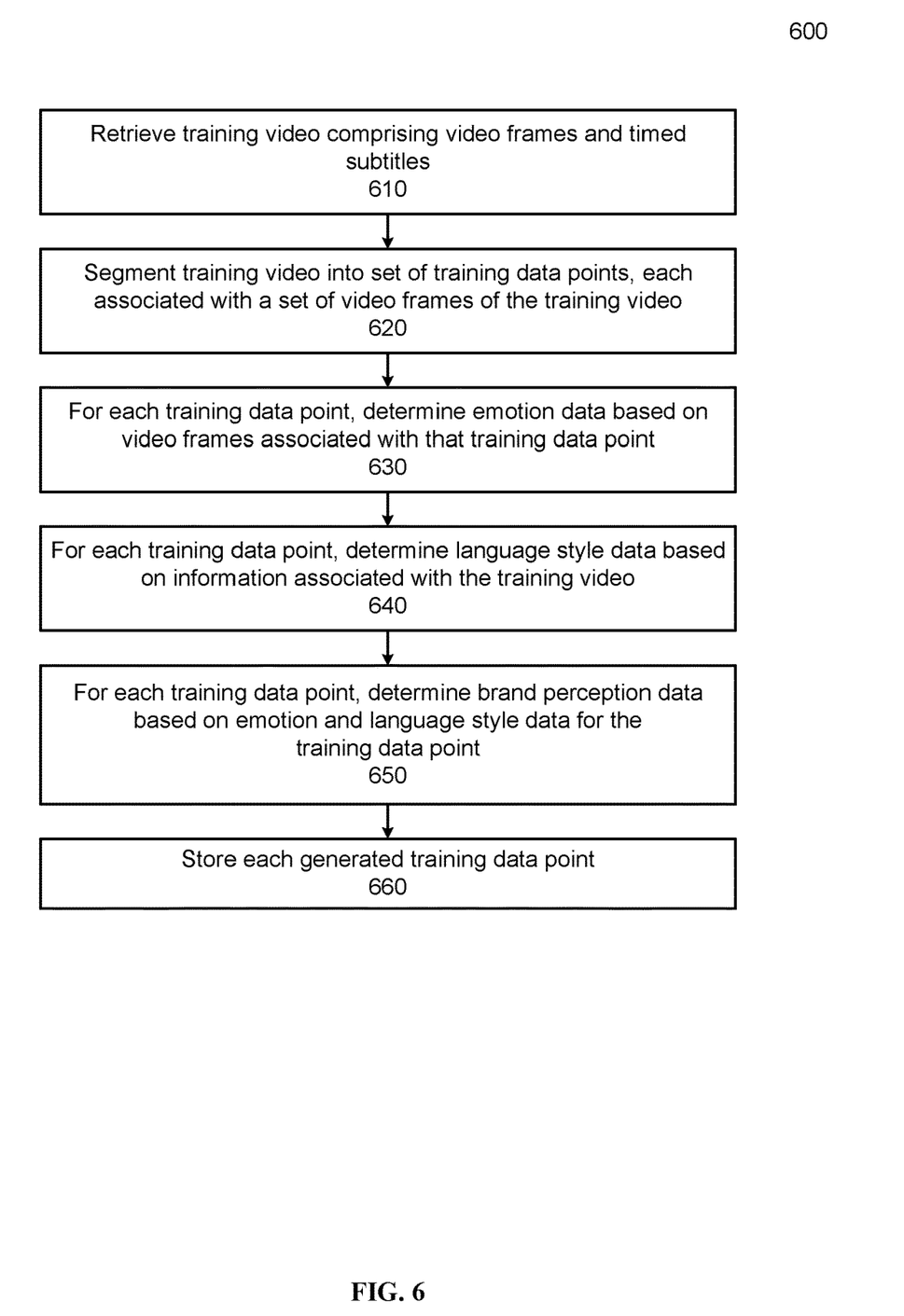
FIG. 6 is a flowchart depicting an example process for generating a training data point based on a segment of a training video, according to one embodiment.

FIG. 6 is a flowchart depicting an example process for generating a training data point based on a segment of a training video, according to one embodiment. The process 600 of FIG. 6 begins when the training data system retrieves 610 a training video comprising video frames and timed subtitles. The training video can then be segmented 620 into a set of training data points, where each training data point is associated with a set of video frames of the original training video. For each of the training data points, the training data system can determine 630 emotion data based on the video frames associated with that training data point. Similarly, the training data system can determine 640 language style data for the training data point based on the training video, and further determine 650 brand perception data based on the emotion and language style data for the training data point. Finally the generated training data point (including the emotion, language style, and brand perception data) can be stored 660.

Example Implementations

Embodiments of the present invention may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

With these embodiments in mind, it will be apparent from this description that aspects of the described techniques may be embodied, at least in part, in software, hardware, firmware, or any combination thereof. It should also be understood that embodiments could employ various computer-implemented functions involving data stored in a computer system. The techniques may be carried out in a computer system or other training data system in response executing sequences of instructions stored in memory. In various embodiments, hardwired circuitry may be used independently or in combination with software instructions to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be implemented in computer-readable instructions stored on an article of manufacture referred to as a computer-readable medium, which is adapted to store data that can thereafter be read and processed by a computer. Computer-readable media is adapted to store these computer instructions, which when executed by a computer or other training data system, are adapted to cause the system to perform operations according to the techniques described herein. Computer-readable media can include any mechanism that stores information in a form accessible by a data processing device such as a computer, network device, tablet, smartphone, or any device having similar functionality.

Examples of computer-readable media include any type of tangible article of manufacture capable of storing information thereon including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing instructions in an electronic format. Computer-readable media can also be distributed over a network-coupled computer system stored and executed in a distributed fashion.

It should be understood that the various data processing devices and systems are provided for illustrative purposes only, and are not intended to represent any particular architecture or manner of interconnecting components, as such details are not germane to the techniques described herein. It will be appreciated that network computers and other training data systems, which have fewer components or perhaps more components, may also be used. For instance, these embodiments may be practiced with a wide range of computer system configurations including any device that can interact with the Internet via a web browser or an application such as hand-held devices, microprocessor systems, workstations, personal computers ("PCs"), Macintosh computers, programmable consumer electronics, minicomputers, mainframe computers, or any mobile communications device including an iPhone, iPad, Android, or Blackberry device, or any device having similar functionality. These embodiments can also be practiced in distributed computing environments where tasks are performed by remote processing devices that are linked through a wire-based or wireless network.

What is claimed is:

1. A method comprising:
receiving, at a training data system, a video file comprising one or more timed subtitles and a plurality of video frames, each timed subtitle associated with a subset of the video frames of the plurality of video frames;
generating, by the training data system, a training data point for a first timed subtitle of the video file by:
performing facial recognition analysis on the subset of video frames associated with the first timed subtitle; and
determining emotion data for the training data point based on the subset of the video frames associated with the first timed subtitle and the facial recognition analysis; and
storing, by the training data system, the training data point.

2. The method of claim 1, wherein generating a training data point for a first timed subtitle further comprises:
determining, by the training data system, language style data for the training data point based on the first timed subtitle and metadata of the video file, the language style data describing the tone or formality of the first timed subtitle.

3. The method of claim 2, wherein generating a training data point for a first timed subtitle further comprises:
determining, by the training data system, brand perception data for the training data point based on a weighted combination of the emotion data and the language style data associated with the training data point.

4. The method of claim 1, wherein receiving a video file comprising one or more timed subtitles and a plurality of video frames comprises:
receiving, at the training data system, a set of video files, each video file comprising one or more timed subtitles and a plurality of video frames.

5. The method of claim 1, wherein receiving a video file comprising one or more timed subtitles and a plurality of video frames further comprises:
filtering, at the training data system, the set of video files based on metadata associated with each video file; and
associating one or more video files of the set of video files with a NLP training set.

6. The method of claim 1, further comprising associating the training data point with a NLP training set.

7. The method of claim 6, further comprising transmitting the NLP training set to an outside system, the outside system configured to train a machine learning model based on the NLP training set.

8. The method of claim 1, wherein the training data point is associated with a target language.

9. The method of claim 1, wherein determining emotion data for the training data point comprises performing emotion recognition analysis to associate faces recognized by the facial recognition analysis with one or more emotions.

10. A non-transitory computer readable storage medium comprising instructions which, when executed by a processor, cause the processor to perform the steps of:
receiving, at a training data system, a video file comprising one or more timed subtitles and a plurality of video frames, each timed subtitle associated with a subset of the video frames of the plurality of video frames;
generating, by the training data system, a training data point for a first timed subtitle of the video file by:
performing facial recognition analysis on the subset of video frames associated with the first timed subtitle; and
determining emotion data for the training data point based on the subset of the video frames associated with the first timed subtitle and the facial recognition analysis; and
storing, by the training data system, the training data point.

11. The non-transitory computer readable storage medium of claim 10, wherein generating a training data point for a first timed subtitle further comprises:
determining, by the training data system, language style data for the training data point based on the first timed subtitle and metadata of the video file, the language style data describing the tone or formality of the first timed subtitle.

12. The non-transitory computer readable storage medium of claim 11, wherein generating a training data point for a first timed subtitle further comprises:
determining, by the training data system, brand perception data for the training data point based on a weighted combination of the emotion data and the language style data associated with the training data point.

13. The non-transitory computer readable storage medium of claim 10, wherein receiving a video file comprising one or more timed subtitles and a plurality of video frames comprises:
receiving, at the training data system, a set of video files, each video file comprising one or more timed subtitles and a plurality of video frames.

14. The non-transitory computer readable storage medium of claim 10, wherein receiving a video file comprising one or more timed subtitles and a plurality of video frames further comprises:
filtering, at the training data system, the set of video files based on metadata associated with each video file; and
associating one or more video files of the set of video files with a NLP training set.

15. The non-transitory computer readable storage medium of claim 14, further comprising associating the training data point with a NLP training set.

16. The non-transitory computer readable storage medium of claim 15, further comprising transmitting the NLP training set to an outside system, the outside system configured to train a machine learning model based on the NLP training set.

17. The non-transitory computer readable storage medium of claim 10, wherein the training data point is associated with a target language.

18. The non-transitory computer readable storage medium of claim 10, wherein determining emotion data for the training data point comprises performing emotion recognition analysis to associate faces recognized by the facial recognition analysis with one or more emotions.

* * * * *